United States Patent
Yin et al.

(10) Patent No.: US 11,662,630 B2
(45) Date of Patent: May 30, 2023

(54) DISPLAY PANEL AND ELECTRONIC DEVICE

(71) Applicant: WUHAN CHINA STAR OPTOELECTRONICS TECHNOLOGY CO., LTD., Hubei (CN)

(72) Inventors: Weihong Yin, Hubei (CN); Guanghui Liu, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 189 days.

(21) Appl. No.: 17/054,519

(22) PCT Filed: Sep. 16, 2020

(86) PCT No.: PCT/CN2020/115653
§ 371 (c)(1),
(2) Date: Nov. 11, 2020

(87) PCT Pub. No.: WO2022/041342
PCT Pub. Date: Mar. 3, 2022

(65) Prior Publication Data
US 2022/0197074 A1    Jun. 23, 2022

(30) Foreign Application Priority Data
Aug. 31, 2020   (CN) .................... 202010896771.9

(51) Int. Cl.
G02F 1/1343    (2006.01)
G02F 1/1333    (2006.01)

(52) U.S. Cl.
CPC ...... *G02F 1/13439* (2013.01); *G02F 1/13338* (2013.01); *G02F 1/133345* (2013.01)

(58) Field of Classification Search
None
See application file for complete search history.

(56) References Cited

U.S. PATENT DOCUMENTS

| 10,304,913 B2 * | 5/2019 | Choi ................. G09G 3/20 |
| 2015/0168790 A1 * | 6/2015 | Tsuruma ........... G02F 1/134336 349/43 |

(Continued)

FOREIGN PATENT DOCUMENTS

| CN | 107818993 A | 3/2018 |
| CN | 108761885 A | 11/2018 |

(Continued)

*Primary Examiner* — Ryan Crockett
(74) *Attorney, Agent, or Firm* — Mark M. Friedman (57) ABSTRACT

A display panel and an electronic device are provided. The display panel includes a first display area and a second display area. The first display area includes a first liquid crystal layer and a driving circuit layer. The driving circuit layer includes a first driving unit group and a second driving unit. The first driving unit group is configured to drive the first liquid crystal layer. The second display area includes the second liquid crystal layer and the transparent connection layer, and the second driving unit group drives the second liquid crystal layer through the transparent connection layer, so to complete the display area of the display panel.

18 Claims, 8 Drawing Sheets

(56) References Cited

U.S. PATENT DOCUMENTS

| | | | | |
|---|---|---|---|---|
| 2016/0154263 A1* | 6/2016 | Hatsu | ................. | H01L 29/7869 |
| | | | | 349/12 |
| 2017/0162111 A1* | 6/2017 | Kang | ................. | H01L 27/3276 |
| 2020/0174301 A1* | 6/2020 | Tien | ................... | H04M 1/0264 |
| 2021/0013298 A1* | 1/2021 | Her | ..................... | H01L 27/3234 |
| 2021/0327967 A1* | 10/2021 | Zhang | ..................... | G09G 3/20 |
| 2021/0407440 A1* | 12/2021 | Liu | ................... | G02F 1/133615 |
| 2022/0155829 A1* | 5/2022 | Lou | ....................... | H04N 23/90 |
| 2022/0199710 A1* | 6/2022 | Xu | ....................... | G06F 1/1626 |

FOREIGN PATENT DOCUMENTS

| | | | |
|---|---|---|---|
| CN | 110232892 | A | 9/2019 |
| CN | 110286521 | A | 9/2019 |
| CN | 110471211 | A | 11/2019 |
| CN | 110568643 | A | 12/2019 |
| CN | 110634445 | A | 12/2019 |
| CN | 110646985 | A | 1/2020 |
| CN | 209992775 | U | 1/2020 |
| CN | 210052743 | U | 2/2020 |
| CN | 110890026 | A | 3/2020 |
| CN | 210516000 | U | 5/2020 |
| CN | 210516183 | U | 5/2020 |
| CN | 111292617 | A | 6/2020 |
| CN | 111402743 | A | 7/2020 |

\* cited by examiner

DISPLAY PANEL AND ELECTRONIC DEVICE

BACKGROUND OF INVENTION

Field of Invention

The present invention relates to a display technology, and more particularly, to a display panel and an electronic device.

Description of Prior Art

With development of communication technology, electronic devices such as smartphones are becoming more and more popular. In the related art, a camera device is disposed on a backplate of a display panel, and a display panel is provided with a light-transmitting hole corresponding to the camera. The camera obtains external light signals through the light-transmitting hole, and the light-transmitting holes are small in size, which can increase the screen-to-body ratio of the display panel. However, the light-transmitting through hole cannot display images, which makes the display area of the display panel incomplete.

SUMMARY OF INVENTION

A display panel and an electronic device are provided, which can increase the screen-to-body ratio of the display panel and complete the display area of the display panel.

A display panel comprises:

a first display area comprising a first liquid crystal layer and a driving circuit layer, and the first liquid crystal layer and the driving circuit layer are stacked, the driving circuit layer comprises a first driving unit group and a second driving unit group, and the first driving unit group is configured to drive the first liquid crystal layer; and a second display area adjacent to the first display area, and the second display area comprises a second liquid crystal layer and a transparent connection layer, and the second driving unit group drives the second liquid crystal layer through the transparent connection layer.

In one embodiment, the first display area further comprises an electrical connection layer, and the second driving unit group is connected to the transparent connection layer through the electrical connection layer.

In one embodiment, the electrical connection layer and the transparent connection layer are disposed in a same layer.

In one embodiment, an insulating layer is disposed between the electrical connection layer and the driving circuit layer, a first via hole is formed in the insulating layer, and the electrical connection layer is connected to the second driving unit group through a first trace line disposed in the first via hole.

In one embodiment, the second display area further comprises a common electrode layer and a pixel electrode layer, the transparent connection layer is disposed on a side of the common electrode layer away from the pixel electrode layer, and the second liquid crystal layer is disposed on a side of the pixel electrode layer away from the common electrode layer.

In one embodiment, the pixel electrode layer comprises a pixel electrode group, and the pixel electrode group is connected to the transparent connection layer through a second trace line disposed in a second via hole.

In one embodiment, the second driving unit group comprises a plurality of second driving units, the pixel electrode layer further comprises a plurality of control electrodes, each of the control electrodes is connected to one of the second driving units, and the second driving unit is configured to drive the second liquid crystal layer corresponding to the control electrode in a first state or a second state.

In one embodiment, the first display area comprises a transition display area and a main display area, the transition display area is adjacent to the second display area, and the second driving unit group is disposed in the transition display area.

In one embodiment, the main display area is provided with a plurality of first pixels, the transition display area is provided with a plurality of second pixels, and a distribution density of the second pixels is less than a distribution density of the first pixels.

In one embodiment, the second display area is provided with a plurality of third pixels, and a distribution density of the third pixels is less than or equal to a distribution density of the second pixels In one embodiment, an edge area is disposed between the transition display area and the main display area, the edge area comprises a first part located in the transition display area, and a distribution density of the second pixels in the first part is greater than a distribution density of other second pixels.

In one embodiment, an edge area is disposed between the transition display area and the main display area, the edge area comprises a second part located in the transition display area, and a distribution density of the second pixels in the second part is less than a distribution density of other second pixels.

In one embodiment, an edge area is disposed between the transition display area and the main display area, the edge area comprises a first part located in the transition display area and a second part located in the main display area, a distribution density of the second pixels in the first part is greater than a distribution density of other second pixels, and a distribution density of the first pixels in the second part is less than a distribution density of other first pixels.

An electronic device comprises:

a display panel, and the display panel comprises a first display area and a second display area, a first display area comprises a first liquid crystal layer and a driving circuit layer, the first liquid crystal layer and the driving circuit layer are stacked, the driving circuit layer comprises a first driving unit group and a second driving unit group, and the first driving unit group is configured to drive the first liquid crystal layer; and a second display area adjacent to the first display area, the second display area comprises a second liquid crystal layer and a transparent connection layer, and the second driving unit group drives the second liquid crystal layer through the transparent connection layer; and a camera device, and the camera device is at least partially disposed and corresponds to the second display area, and the camera device collects external light signals through the second display area for imaging.

In one embodiment, the first display area further comprises an electrical connection layer, and the second driving unit group is connected to the transparent connection layer through the electrical connection layer.

In one embodiment, the first display area comprises a transition display area and a main display area, the transition display area is adjacent to the second display area, and the second driving unit group is disposed in the transition display area.

In one embodiment, the main display area is provided with a plurality of first pixels, the transition display area is provided with a plurality of second pixels, and a distribution density of the second pixels is less than a distribution density of the first pixels.

In one embodiment, the electronic device further comprises a processor, wherein the camera device and the display panel are electrically connected to the processor, and the processor is configured to control light transmittance of the second display area to be greater than a preset when the camera device is in an operating state, and the second display area is controlled to display preset picture when the camera device is in a non-working state.

DETAILED DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work are within the claimed scope of this application.

In one embodiment, a display panel comprises a first display area comprising a first liquid crystal layer and a driving circuit layer, and the first liquid crystal layer and the driving circuit layer are stacked, the driving circuit layer comprises a first driving unit group and a second driving unit group, and the first driving unit group is configured to drive the first liquid crystal layer; and a second display area adjacent to the first display area, and the second display area comprises a second liquid crystal layer and a transparent connection layer, and the second driving unit group drives the second liquid crystal layer through the transparent connection layer.

In the display panel according to one embodiment of the present invention, the first display area further comprises an electrical connection layer, and the second driving unit group is connected to the transparent connection layer through the electrical connection layer.

In the display panel according to one embodiment of the present invention, the electrical connection layer and the transparent connection layer are disposed in a same layer.

In the display panel according to one embodiment of the present invention, an insulating layer is disposed between the electrical connection layer and the driving circuit layer, a first via hole is formed in the insulating layer, and the electrical connection layer is connected to the second driving unit group through a first trace line disposed in the first via hole.

In the display panel according to one embodiment of the present invention, the second display area further comprises a common electrode layer and a pixel electrode layer, the transparent connection layer is disposed on a side of the common electrode layer away from the pixel electrode layer, and the second liquid crystal layer is disposed on a side of the pixel electrode layer away from the common electrode layer.

In the display panel according to one embodiment of the present invention, the pixel electrode layer comprises a pixel electrode group, and the pixel electrode group is connected to the transparent connection layer through a second trace line disposed in a second via hole.

In the display panel of the embodiment of the present invention, the pixel electrode layer further comprises a plurality of connected control electrodes. The display panel further comprises a non-display area and a driving chip, and the driving chip is disposed in the non-display area. The driving chip is electrically connected to the plurality of connected control electrodes, and the driving chip is configured to control the second liquid crystal layer corresponding to the plurality of connected control electrodes to be in a first state or a second state.

In the display panel according to one embodiment of the present invention, the first display area comprises a transition display area and a main display area, the transition display area is adjacent to the second display area, and the second driving unit group is disposed in the transition display area.

In the display panel according to one embodiment of the present invention, the main display area is provided with a plurality of first pixels, the transition display area is provided with a plurality of second pixels, and a distribution density of the second pixels is less than a distribution density of the first pixels.

In the display panel according to one embodiment of the present invention, the second display area is provided with a plurality of third pixels, and a distribution density of the third pixels is less than or equal to a distribution density of the second pixels In the display panel according to one embodiment of the present invention, an edge area is disposed between the transition display area and the main display area, the edge area comprises a first part located in the transition display area, and a distribution density of the second pixels in the first part is greater than a distribution density of other second pixels.

In the display panel according to one embodiment of the present invention, an edge area is disposed between the transition display area and the main display area, the edge area comprises a second part located in the transition display area, and a distribution density of the second pixels in the second part is less than a distribution density of other second pixels.

In the display panel according to one embodiment of the present invention, an edge area is disposed between the transition display area and the main display area, the edge area comprises a first part located in the transition display area and a second part located in the main display area, a distribution density of the second pixels in the first part is greater than a distribution density of other second pixels, and a distribution density of the first pixels in the second part is less than a distribution density of other first pixels.

In one embodiment, An electronic device comprises:

a display panel, and the display panel comprises a first display area and a second display area, a first display area comprises a first liquid crystal layer and a driving circuit layer, the first liquid crystal layer and the driving circuit layer are stacked, the driving circuit layer comprises a first driving unit group and a second driving unit group, and the first driving unit group is configured to drive the first liquid crystal layer; and a second display area adjacent to the first display area, the second display area comprises a second liquid crystal layer and a transparent connection layer, and the second driving unit group drives the second liquid crystal layer through the transparent connection layer; and a camera device, and the camera device is at least partially disposed and corresponds to the second display area, and the camera device collects external light signals through the second display area for imaging.

In the electronic device according to one embodiment of the present invention, the first display area further comprises an electrical connection layer, and the second driving unit group is connected to the transparent connection layer through the electrical connection layer.

In the electronic device according to one embodiment of the present invention, the first display area comprises a transition display area and a main display area, the transition display area is adjacent to the second display area, and the second driving unit group is disposed in the transition display area.

In the electronic device according to one embodiment of the present invention, the main display area is provided with a plurality of first pixels, the transition display area is provided with a plurality of second pixels, and a distribution density of the second pixels is less than a distribution density of the first pixels.

In the electronic device according to one embodiment of the present invention, the electronic device further comprises a processor, and the camera device and the display panel are electrically connected to the processor, and the processor is configured to control light transmittance of the second display area to be greater than a preset when the camera device is in an operating state, and the second display area is controlled to display preset picture when the camera device is in a non-working state.

Figure 1:
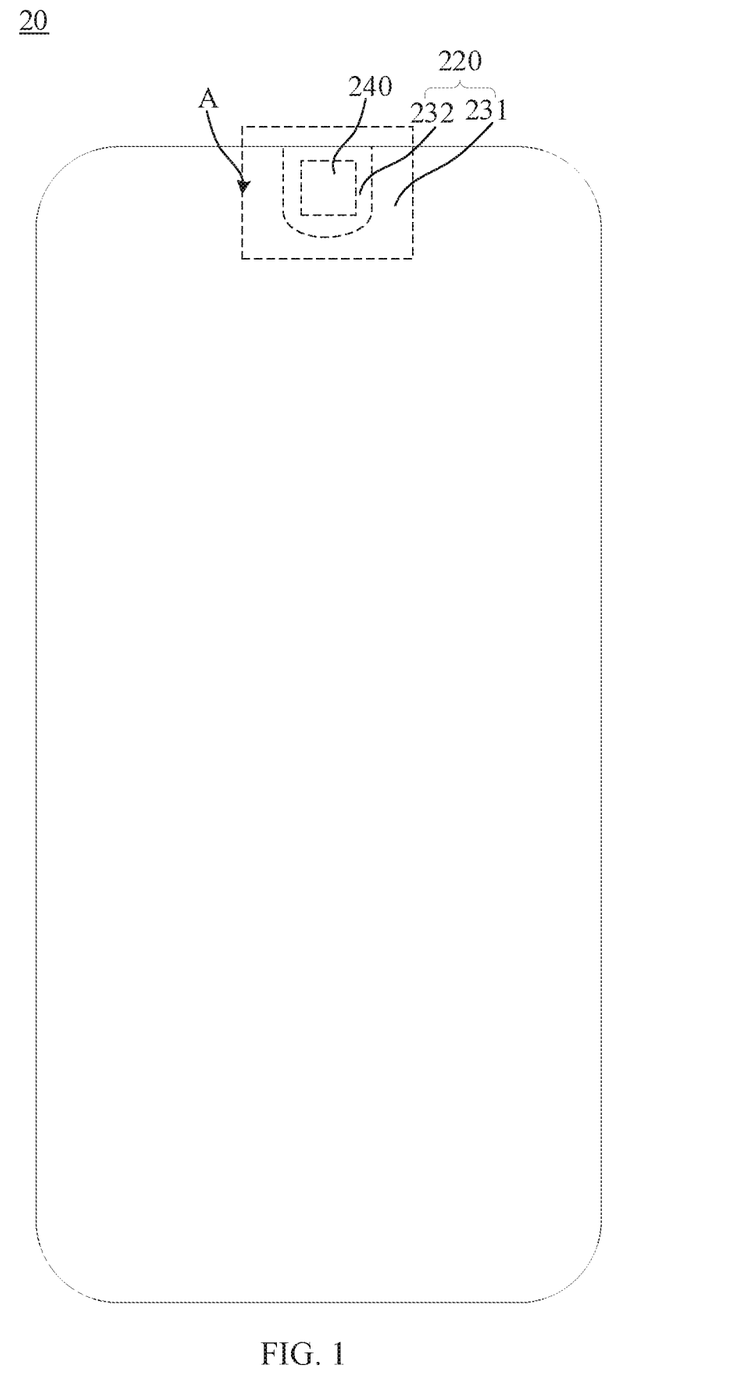
FIG. 1 is a schematic structural view of a display panel according to one embodiment of the present invention.
Figure 2:
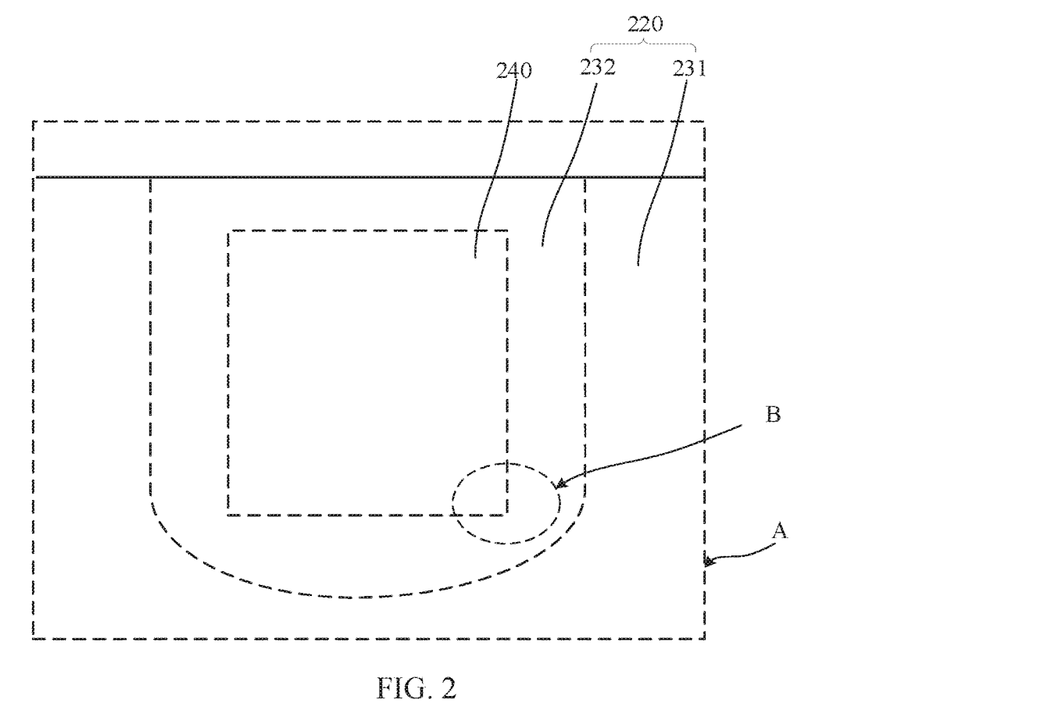
FIG. 2 is an enlarged schematic view of a part A of the display panel according to one embodiment of the present invention.

Referring to FIG. 1 and FIG. 2, FIG. 1 is a schematic structural view of a display panel according to one embodiment of the present invention, and FIG. 2 is an enlarged schematic view of a part A of the display panel according to one embodiment of the present invention.

The display panel 20 comprises a first display area 220 and a second display area 240 adjacent to each other. The first display area 220 and the second display area 240 may display the same picture. For example, the first display area 220 displays a part of the preset picture, and the second display area 240 displays the remaining part of the preset picture. The first display area 220 and the second display area 240 may also display different pictures.

For example, the second display area 240 may display a preset picture, and the second display area 240 may display task bar screens such as battery, clock or network status. It is understandable that the second display area 240 may display less demanding picture. The second display area 240 and the first display area 220 may display content, so that the display area is to be perfect. The display panel 20 has a high screen-to-body ratio. The first display area 220 may be disposed around the second display area 240, and the periphery of the second display area 240 may be adjacent to the first display area 220, that is, the second display area 240 is located in the middle of the first display area 220. The first display area 220 may also partially surround the second display area 240, and a part of the edge of the second display area 240 is adjacent to the first display area 220.

Figure 3:
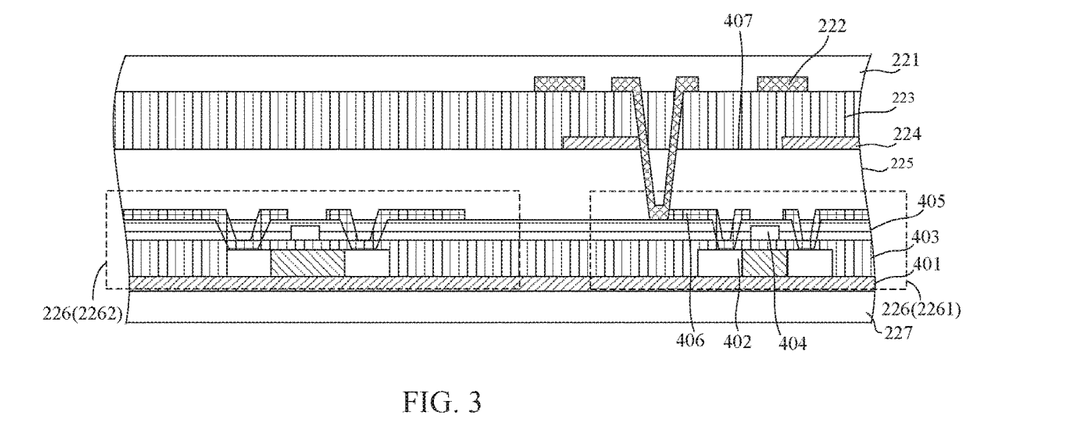
FIG. 3 is a schematic view of a stacked structure of the first display area according to one embodiment of the present invention.

The stacked structure of the first display area 220 and the second display area 240 are not the same. FIG. 3 is a schematic view of a stacked structure of the first display area according to one embodiment of the present invention.

The first display area 220 comprises a first liquid crystal layer 221 and a driving circuit layer 226. The first liquid crystal layer 221 and the driving circuit layer 226 are stacked. The driving circuit layer 226 comprises a first driving unit group 2261 and a second driving unit group 2262, and the first driving unit group 2261 is configured to drive the first liquid crystal layer 221.

The first display area 220 comprises a first liquid crystal layer 221 and a driving circuit layer 226. The first liquid crystal layer 221 and the driving circuit layer 226 are stacked. The driving circuit layer 226 includes a first driving unit group 2261 and a second driving unit group 2262. A driving unit group 2261 is used to drive the first liquid crystal layer 221.

The first display area 220 may further comprise a pixel electrode layer 222, a passivation layer 223, a common electrode layer 224, a planarization layer 225, and a substrate 227. The substrate 227, the driving circuit layer 226, the polarization layer 225, the common electrode layer 224, the passivation layer 223, the pixel electrode layer 222, and the first liquid crystal layer 221 are disposed in order.

The substrate 227 may be used as a carrying platform for the display panel, and the substrate 227 may be made of glass, plastic, resin, or other materials.

The driving circuit layer 226 is disposed on the substrate 227. The driving circuit layer 226 comprises a first driving unit group 2261 for driving the first liquid crystal layer 221 in the first display area 220 and a second driving unit group 2262 for driving the second liquid crystal layer 241 in the second display area 240. Each first driving unit group 2261 comprises at least one thin film transistor, and each second driving unit group 2262 comprises at least one thin film transistor.

In some embodiments, the driving circuit layer 226 comprises a buffer layer 401, a polysilicon layer 402, a gate insulating layer 403, a gate 404, an interlayer insulating layer 405, a source 406, and a drain 407. The buffer layer 401 is disposed on the substrate 227. The polysilicon layer 402 is disposed on the buffer layer 401. The gate insulating layer 403 is disposed on the polysilicon layer 402. The gate 404 is disposed on the gate insulating layer 403. The interlayer insulating layer 405 is disposed on the gate 404. The source 406 and the drain 407 are disposed on the interlayer insulating layer 405. The source 406, the drain 407, and the gate 404 form a thin film transistor. The first driving unit group 2261 in the driving circuit layer 226 comprises at least one thin film transistor for driving the first liquid crystal layer 221 of the first display area 220.

The polarization layer 225 is disposed on the driving circuit layer 226. The common electrode layer 224 is disposed on the polarization layer 225. The passivation layer 223 is disposed on the common electrode layer 224. The pixel electrode layer 222 is disposed on the passivation layer 223. The first liquid crystal layer 221 is disposed on the passivation layer 223. In order to enable the first driving unit group to drive the first liquid crystal layer 221, a second via hole penetrating the planarization layer 225, the common electrode layer 224, and the passivation layer 223 is formed. A second trace line is disposed in the second via hole. The second trace line may be made of conductive material, such as an ITO electrode. The second trace line connects the source of the thin film transistor of the first driving unit group 2261 and the corresponding pixel electrode in the pixel electrode layer 222, so that the thin film transistor can control the pixel electrode, and then control the deflection direction of the first liquid crystal layer corresponding to the pixel electrode.

Figure 4:
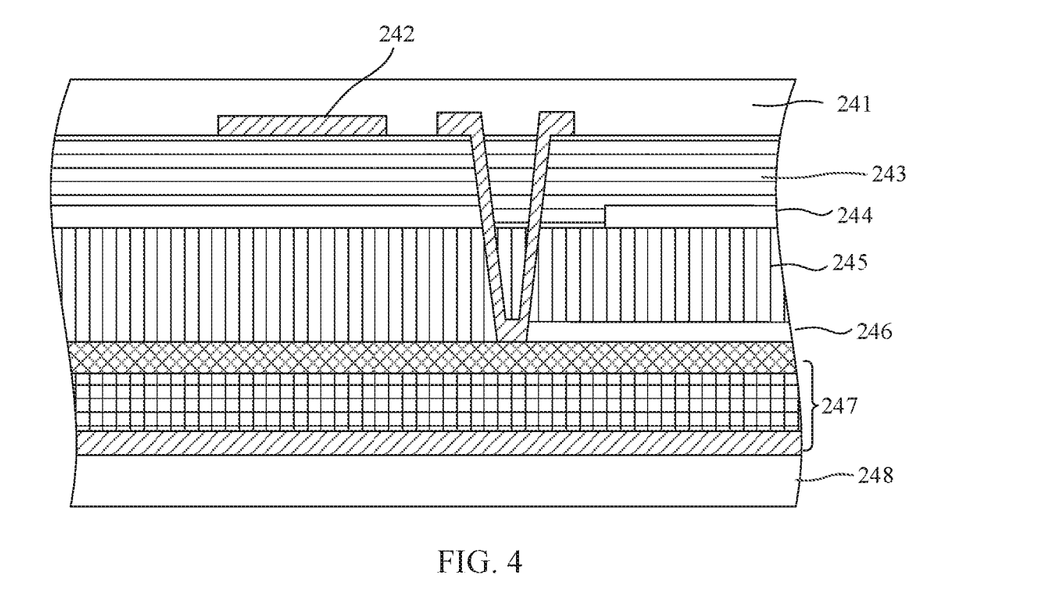
FIG. 4 is a schematic diagram of a stacked structure of a second display area according to one embodiment of the present invention.

The second display area comprises a transparent connection layer, and the second driving unit group disposed in the first display area can drive the second liquid crystal layer in the second display area through the transparent connection layer. Referring to FIG. 4, FIG. 4 is a schematic diagram of a stacked structure of a second display area according to one embodiment of the present invention.

The second display area 240 is adjacent to the first display area 220. The second display area 240 comprises a second liquid crystal layer 241 and a transparent connection layer 246. The second driving unit group 2262 drives the second liquid crystal layer 241 through the transparent connection layer 246.

The transparent connection layer 246 comprises a transparent electrode. The transparent electrode is configured to connect the thin film transistor in the second driving unit group and the pixel electrode disposed in the second display area 240.

The second display area 240 further comprises a pixel electrode layer 242, a passivation layer 243, a common electrode layer 244, a planarization layer 245, a spacer layer 247, and a substrate 248. The substrate 248, the spacer layer 247, the transparent connection layer 246, and the planarization layer 245, the common electrode layer 244, the passivation layer 243, the pixel electrode layer 242, and the second liquid crystal layer 241 are stacked in order In some embodiments, the spacer layer 247 is disposed on the substrate 248. The spacer layer 247 and the driving circuit layer 226 of the first display area 220 may be disposed on the same layer. The transparent connection layer 246 is disposed on the spacer layer 247. The transparent electrode in the transparent connection layer 246 may be electrically connected to the source of the second driving unit group 2262.

In some embodiments, the first display area 220 further comprises an electrical connection layer, and the second driving unit group 2262 is connected to the transparent connection layer 246 through the electrical connection layer. The electrical connection layer and the transparent connection layer 246 may be disposed on the same layer. The transparent connection layer 246 may also be disposed above or below the electrical connection layer, and is directly electrically connected through the stacked structure. An insulating layer may also be disposed between the electrical connection layer and the driving circuit layer, and the insulating layer is provided with a first via hole. The electrical connection layer is connected to the second driving unit group 2262 through the first trace line disposed in the first via hole.

In order to prevent the electric potential generated by the transparent electrode in the transparent connection layer 246 from interfering with the display of the second display area 240, and the transparent connection layer 246 is disposed on the side of the common electrode layer 224 away from the pixel electrode layer 222. The second liquid crystal layer 241 is disposed on the side of the pixel electrode layer 242 away from the common electrode layer 224, and the planarization layer 245 is disposed between the common electrode layer 244 and the transparent connection layer 246. Specifically, the planarization layer 245 is disposed on the transparent connection layer. The common electrode layer 224 is disposed on the planarization layer 225. The passivation layer 223 is disposed on the common electrode layer 224. The pixel electrode layer 222 is disposed on the passivation layer 223. The second liquid crystal layer 241 is disposed on the passivation layer 223. In order to enable the second driving unit group 2262 to drive the second liquid crystal layer 241, the second display area 240 is provided with a third via hole penetrating the transparent connection layer 246, the planarization layer 245, the common electrode layer 244, and the passivation layer 243. A third trace line is disposed in the third via hole, and the third trace line connects the pixel electrode of the second display area 240 with the transparent electrode in the transparent connection layer 246. The thin film transistors of the second driving unit group 2262 are connected to the transparent electrodes in the transparent connection layer 246 to control the pixel electrodes of the second display area 240, so that the deflection of the second liquid crystal layer 241 corresponding to the pixel electrode of the second display area 240 is controlled.

It should be noted that each layer in the second display area 240 may adopt light-transmitting materials to increase the light transmittance of the second display area 240. For example, the substrate 248, the spacer layer 247, the transparent connection layer 246, the planarization layer 245, the common electrode layer 244, the passivation layer 243, and the pixel electrode layer 242 of the second display area 240 may be made of light-transmitting materials because the thin film transistors in the driving circuit layer 226 are opaque. The thin film transistors driving the second liquid crystal layer 241 are disposed in the first display area 220 to increase the light transmittance of the second display area 240.

Figure 5:
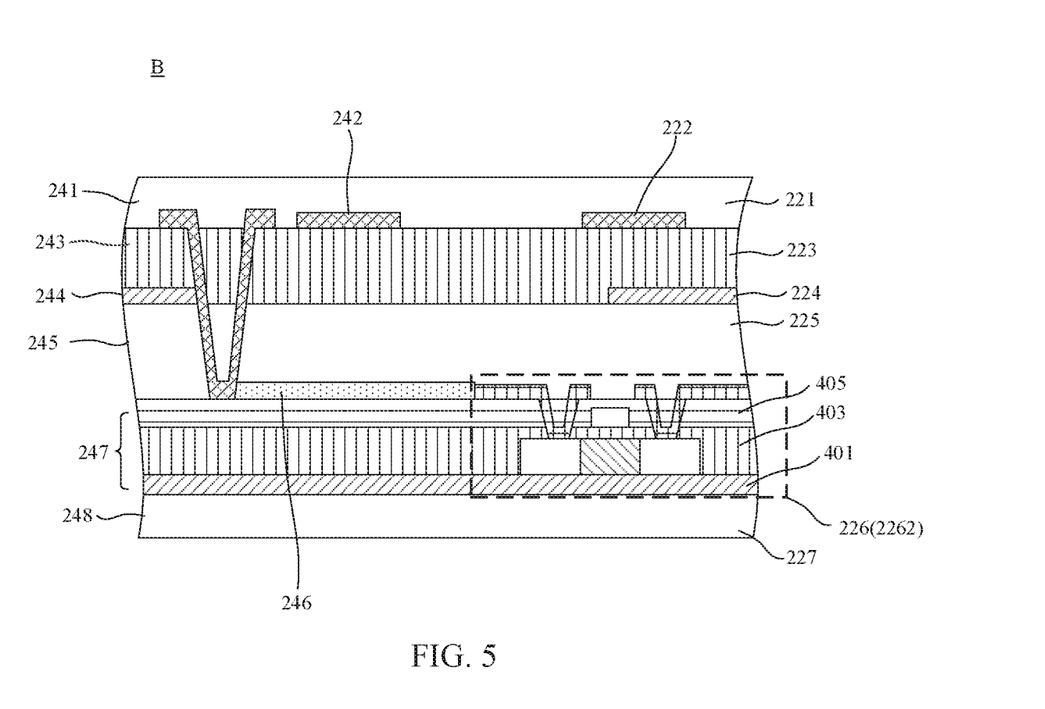
FIG. 5 is a schematic view of a stacked structure of the area B in the FIG. 2.

Referring to FIG. 2 and FIG. 5, FIG. 5 is a schematic view of a stacked structure of the area B in the FIG. 2.

The first display area 220 comprises a main display area 231 and a transition display area 232. The transition display area 232 and the second display area 240 are adjacent to each other. In order to reduce the number and length of the transparent electrodes in the transparent connection layer 246, the second driving unit group 2262 is disposed in the transition display area 232, the first driving unit group 2261 is disposed in the main display area 231, and the second driving unit group 2262 is disposed in the transition display area 232. In some embodiments, in order to improve the display quality of the transition display area 232, the transition display area 232 may be provided with the first driving unit group 2261 and the second driving unit group 2262 at the same time.

In the transition display area 232, except for the driving circuit layer 226, light-transmitting materials are adopted in each layer to improve the light transmittance of the transition display area 232. For example, the substrate 227, the planarization layer 225, the common electrode layer 224, the passivation layer 223, and the pixel electrode layer 222 of the transition display area 232 may be made of light-transmitting materials. The thin film transistors of the driving circuit layer 226 do not adopt light-transmitting materials, and other parts of the driving circuit layer 226 may also be made of light-transmitting materials except for the thin film transistors.

It can be understood that the solutions of improving the light transmittance of the material and changing the wiring arrangement to transition the display area 232 are within the scope of the present invention. The driving circuit layer 226 of the transition display area 232 may be provided with a second driving unit group 2262. The circuit of the second driving unit group 2262 is simpler than that of the first driving unit group, so that the number of thin film transistors in the second driving unit group 2262 is less than the number of thin film transistors in the first driving unit group 2261. Because the transistors are opaque, thin film transistors in the second driving unit group 2262 are less. Thus, the opaque area of the transition display area 232 is naturally smaller, and the light transmittance of the transition display area 232 can be improved. Since the transition display area 232 is adjacent to the second display area 240, the second display area 240 can be supplemented with light to increase the amount of light entering the second display area 240.

In some embodiments, the first liquid crystal layer 221 and the second liquid crystal layer 241 are further provided with a color filter and an upper polarizer, and the substrate 227 is further provided with a lower polarizer and a backlight module.

In the present invention, the second liquid crystal layer disposed in the second display area is electrically connected to the second driving unit group disposed in the first display area through the transparent connection layer, and the second driving unit group that does not transmit light is disposed in the first display area, so as to increase the light transmittance of the second display area, and the camera device can collect external light signals through the second display area for imaging.

Figure 6:
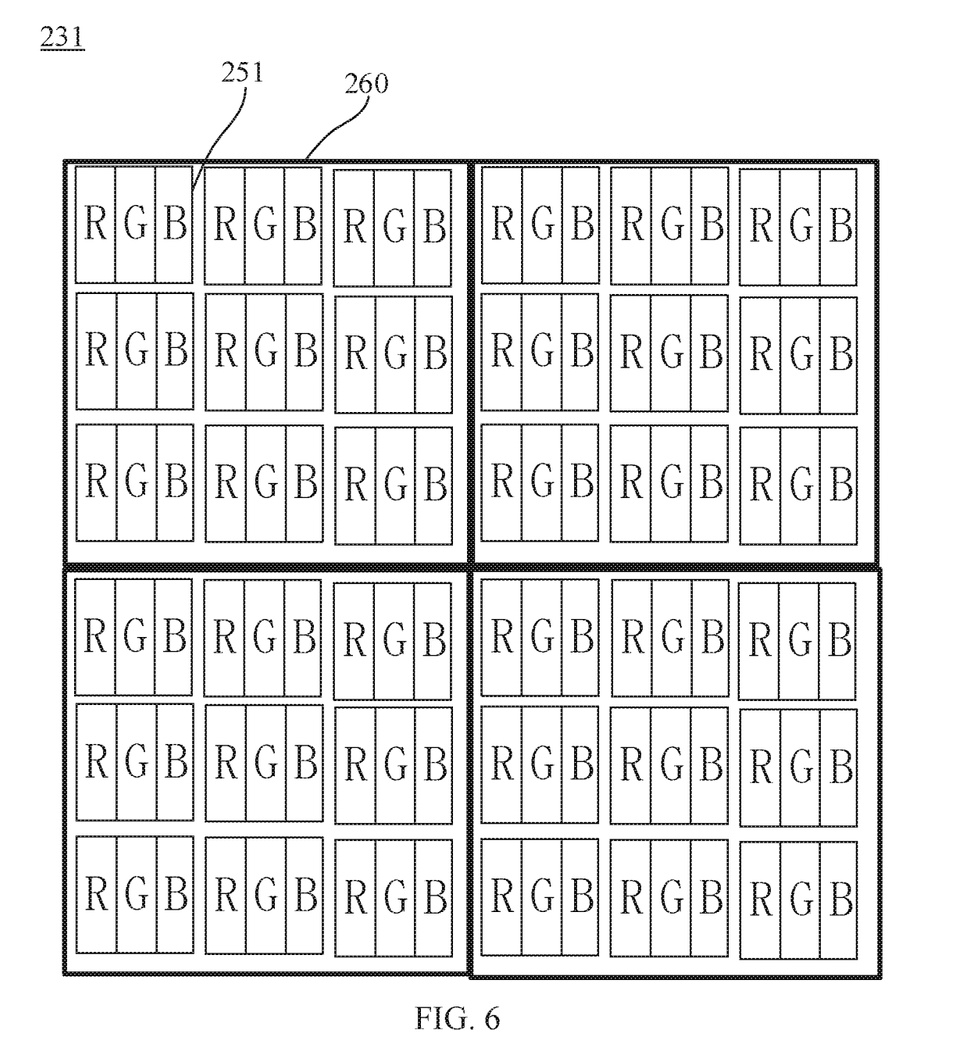
FIG. 6 is a schematic view of the pixel distribution of the main display area according to one embodiment of the present invention.
Figure 7:
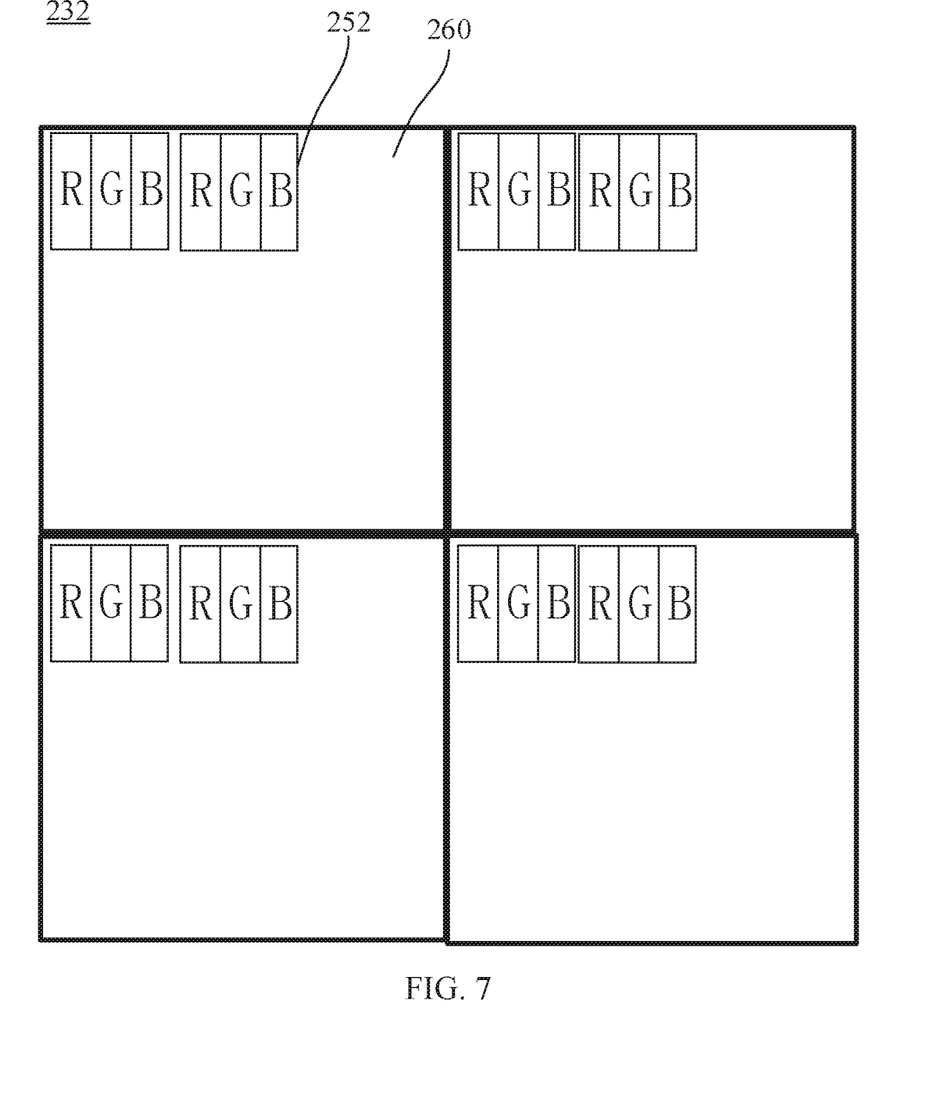
FIG. 7 is a schematic view of pixel distribution in a transition display area according to one embodiment of the present invention.
Figure 8:
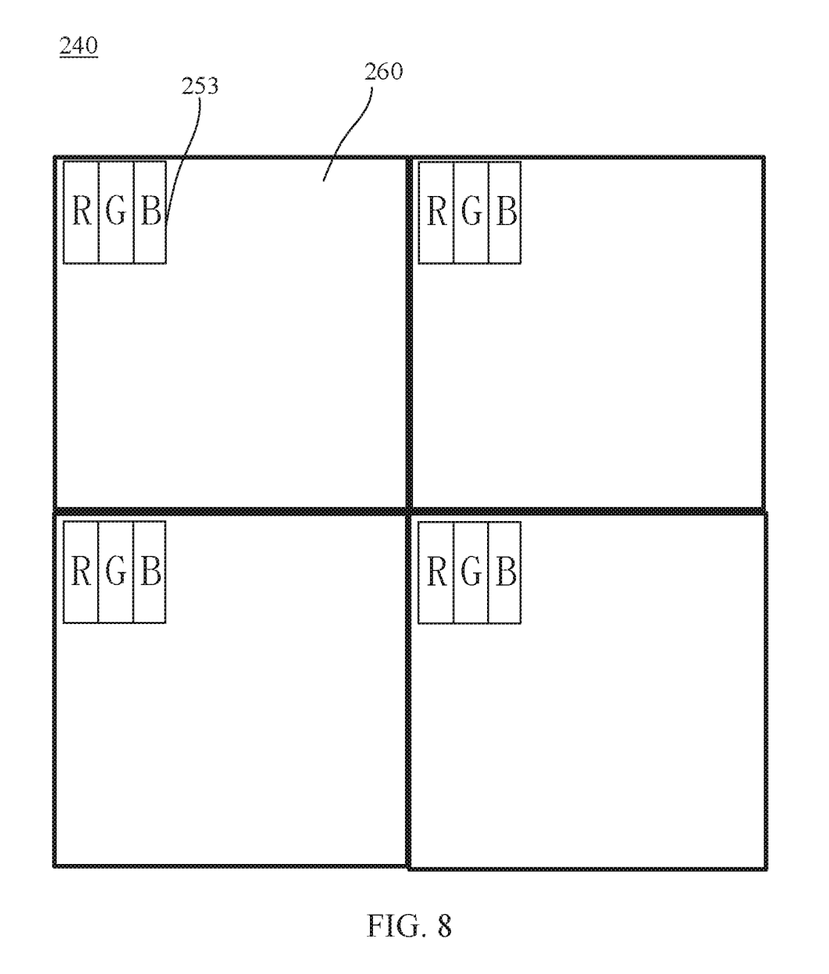
FIG. 8 is a schematic view of pixel distribution in a second display area according to one embodiment of the present invention.

In some embodiments, it may increase the light transmittance of the second display area by changing the pixel distribution density of the first display area and the second display area. Specifically, referring to FIG. 6, FIG. 7, and FIG. 8, FIG. 6 is a schematic view of the pixel distribution of the main display area according to one embodiment of the present invention. FIG. 7 is a schematic view of pixel distribution in a transition display area according to one embodiment of the present invention. FIG. 8 is a schematic view of pixel distribution in a second display area according to one embodiment of the present invention.

The second display area 240, the transition display area 232, and the main display area 231 are provided with a plurality of pixels. For example, the main display area 231 is provided with a plurality of first pixels 251, and the transition display area 232 is provided with a plurality of second pixels 252. The second display area 240 is provided with a plurality of third pixels 253.

The plurality of pixels may be a standard RGB arrangement, and each pixel can display the required color as needed. For example, one pixel 250 may include sub-pixels in three colors of R, G, and B, which may display various colors such as red, green, blue, white, pink, and cyan as required.

The light transmittance of the corresponding display area can be changed by changing the distribution density of the plurality of pixel units. Referring to FIG. 6, in order to meet the display quality requirements of the main display area, a pixel distribution density in the main display area 231 may be greater than the pixel distribution densities of the transition display area 232 and the second display area 240. For example, the pixels of the main display area 231 have nine first pixels 251 arranged in the same area 260, three first pixels are arranged in each row, and three first pixels are arranged in each column.

Referring to FIG. 7, a pixel distribution density of the transition display area 232 is less than a pixel distribution density of the main display area 231. For example, the pixels of the transition display area 232 are arranged with two second pixels 252 in the same area 260, two second pixels 252 are arranged in the first row, and one pixel 252 is arranged in the first column. In some embodiments, in order to improve the continuity of the display screen between the transition display area 232 and the main display area 231, it can be achieved by changing the pixel distribution density of the edge area between the transition display area 232 and the main display area 231, For example, the pixel distribution density of the first part belonging to the transition display area 232 in the edge area may gradually increase. The pixel distribution density of the first part close to the main display area 231 is greater until it is the same as the pixel distribution density of the main display area 231. For another example, the distribution density of pixels belonging to the second part of the main display area 231 in the edge area may gradually decrease, and the distribution density of pixels in the second part close to the transition display area 232 is smaller until it is the same as the pixel distribution density of the transition display area 232. For another example, the distribution density of pixels belonging to the first part of the transition display area 232 in the edge area gradually increases, and the distribution density of pixels belonging to the main display area 231 gradually decreases, and the position where the first part and the second part are connected has the same pixel distribution density. The specific pixel distribution can be set according to the specific display areas of the main display area 231 and the transition display area 232.

In order to meet the connection between the second display area and the transition display area, the second display area can be set to the same pixel distribution density as the transition display area, but in order to increase the light transmittance of the second display area, the pixel distribution density of the second display area is smaller than the pixel distribution density of the transition display area. Referring to FIG. 8, the pixels in the second display area are arranged with a third pixel 253 in the same area 260. Similarly, in order to improve the continuity of the display between the second display area 240 and the transition display area 232. Similarly, in order to improve the continuity of the display screen between the second display area 240 and the transition display area 232, it can be achieved by changing the pixel distribution density between the edge areas between the second display area 240 and the transition display area 232. For example, the pixel distribution density of the third part belonging to the second display area 240 in the edge area may gradually increase, and the pixel distribution density of the third part close to the transition display area 232 is greater until it is the same as the pixel distribution density of the transition display area 232. For another example, the pixel distribution density of the fourth part of the transition display area 232 in the edge area may gradually decrease. The pixel distribution density of the fourth part close to the second display area 240 is smaller until it is the same as the pixel distribution density of the second display area 240. For another example, the distribution density of pixels belonging to the third part of the second display area 240 in the edge area gradually increases, and the distribution density of pixels belonging to the transition display area 232 gradually decreases, and the connected positions of the third and fourth parts have the same pixel distribution density. The specific pixel distribution can be set according to the specific display area of the second display area 240 and the transition display area 232.

Taking the pixel distribution density of the main display area 231 of 400 PPI (pixels per inch) as an example, the pixel distribution density of the transition display area 232 may be 200 PPI or 131 PPI, and the pixel distribution density of the second display area 240 may be 131 PPI, thereby increasing the light transmittance of the second display area 240. It should be noted that the specific values of the pixel density distributions in different areas are only exemplified, and other pixel density distributions that can increase the light transmittance of the second display area 240 all fall within the scope of the present invention.

For a more comprehensive understanding of the display panel of the embodiment of the present application. The following describes how the implementation panel controls the display of the display panel according to the signal of the camera device.

Please refer to FIG. 2, FIG. 3, FIG. 4, and FIG. 9, FIG. 9 is a schematic structural view of a driving circuit for the second display area and the transition display area according to one embodiment of the present invention.

Figure 9:
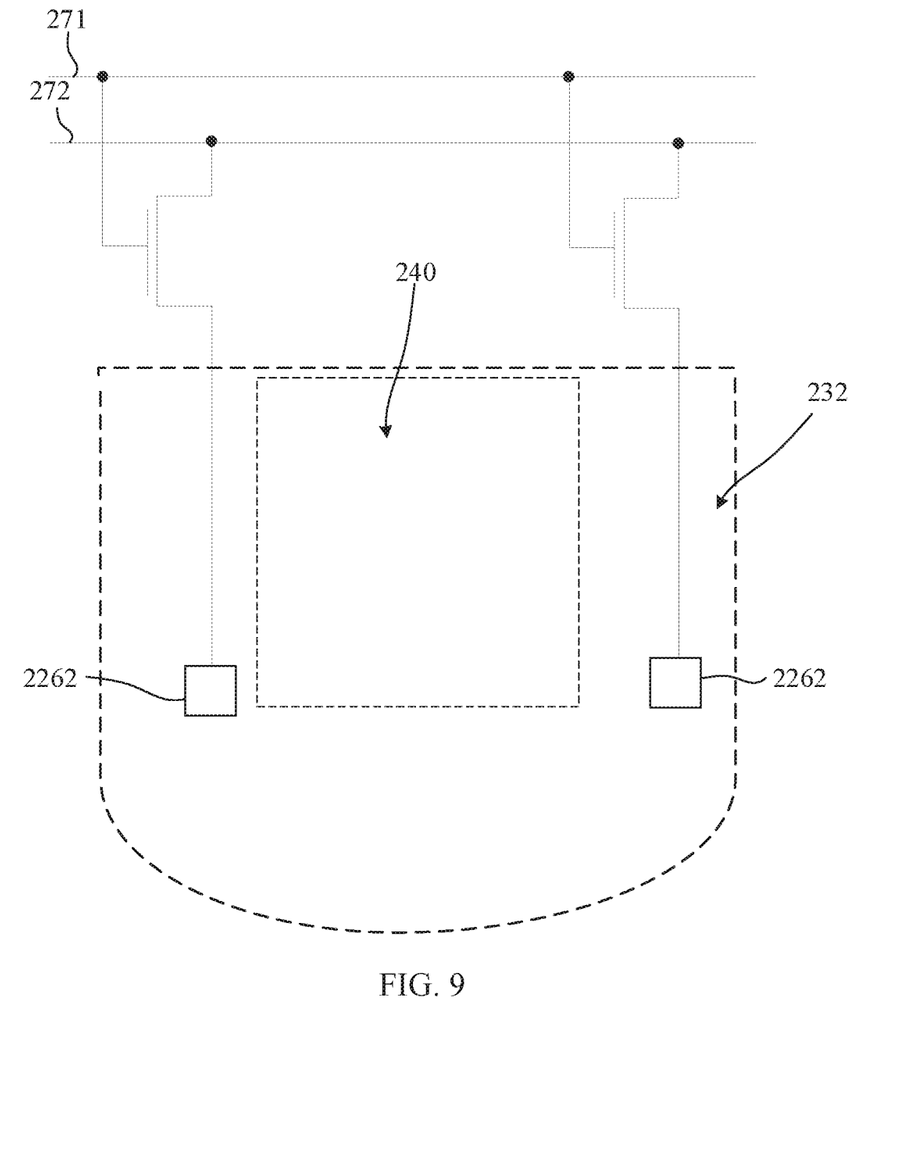
FIG. 9 is a schematic structural view of a driving circuit for the second display area and the transition display area according to one embodiment of the present invention.

In order to realize that when the camera device is in operation, the light transmittance of the second display area 240 can reach the preset light transmittance, that is, the camera device can collect external light signals through the second display area 240 for imaging. For example, when the second driving unit group 2262 provides high voltage signals to the pixel electrode of the pixel electrode layer 242 of the second display area 240, the pixel electrode and the common electrode are at a high clamping voltage, and the liquid crystal deflection of the second liquid crystal layer 241 is controlled to the first predetermined angle, so the light transmittance of the second liquid crystal layer 241 can reach the predetermined light transmittance. That is, it can be understood that the liquid crystal layer is in a light-transmitting state, and when the second driving unit group 2262 gives a low voltage signal to the pixel electrode of the pixel electrode layer 242 of the second display area 240, it controls the liquid crystal of the second liquid crystal layer 241 to deflect a second predetermined angle. The light transmittance of the second liquid crystal layer 241 is made smaller than the preset light transmittance, that is, the second liquid crystal layer 241 is in an opaque state, and the second display area 240 can display images.

In order to control the display of the second display area 240 according to the start or stop signal of the camera, the second display area 240 can be controlled by setting the first control line 271 and the second control line 272. Both the first control line 271 and the second control line 272 are electrically connected to the second driving unit group 2262, the first control line 271 and the second control line 272 are both electrically connected to the driving chip, and the first control line 271 is configured to transmit voltage signal.

The second control line 272 is configured to transmit the startup or shutdown signal of the camera device. The driving chip can transmit the voltage signal to the second driving unit group according to the startup or off state of the camera device, so as to deflect the second liquid crystal layer 241 of the second display area 240. In the transition between the first state and the second state, the first state is that the second liquid crystal layer is in a light-transmitting state, and the second state is that the second liquid crystal layer is in an opaque state. Exemplarily, when it is detected that the imaging device is in the activated state, the second driving unit group is controlled by the driving chip to drive the liquid crystal of the second liquid crystal layer to deflect to the first predetermined angle. When the liquid crystal of the second liquid crystal layer is at the first predetermined angle, the light transmittance of the second display area can reach 95%.

When it is detected that the camera device is in the off state and the signal of the display screen is detected, the second driving unit group is controlled by the driving chip to drive the liquid crystal of the second liquid crystal layer to deflect to a second predetermined angle. When the liquid crystal of the second liquid crystal layer is at the second predetermined angle, the second display area is in the state of displaying the preset picture. When it is detected that the camera device is in the off state and the display picture signal is not detected, the driving chip controls the second display area. The two driving unit groups drive the liquid crystal of the second liquid crystal layer to deflect to a third predetermined angle. When the liquid crystal of the second liquid crystal layer is at the third preset angle, the second display area does not display the preset picture, and the light transmittance is less than the preset light transmittance, that is, the camera device disposed opposite to the second display area cannot be seen from the outside.

In some embodiments, the pixel electrode layer comprises a plurality of pixel electrodes and a plurality of control electrodes. The pixel electrodes can be configured to control RGB pixel units, and the control electrodes can be configured to control transparent pixel units. The second driving unit group comprises a plurality of second driving units. Each second driving unit may be a thin film transistor, and each thin film transistor is connected to a control electrode, so that the second liquid crystal layer corresponding to the control electrode is in the first state or the second state. The first state is that the second liquid crystal layer is in a light-transmitting state, and the second state is that the second liquid crystal layer is in an opaque state. It is understandable that each pixel electrode is connected with a second driving unit, so that the second liquid crystal layer corresponding to the pixel electrode is in a third state, where the third state is a state in which the second liquid crystal layer displays a preset picture.

In some embodiments, a plurality of control electrodes may be connected, such as connecting the plurality of control electrodes through lines to form a first control electrode group. The first control electrode group is connected to a second driving unit. Only one second driving unit can control multiple control electrodes in the pixel electrode layer, reducing the wiring pressure in the first display area.

In some embodiments, the thin film transistors disposed in the non-display that control a plurality of control electrodes can further reduce the wiring pressure in the first display area. Specifically, the display panel further includes a non-display area, the non-display area is provided with a third driving unit group, and the third driving unit group comprises one or more third driving units. The third driving unit may be a thin film transistor, the pixel electrode layer includes a plurality of control electrodes, each control electrode is electrically connected to form a second control electrode group, and the second control electrode group is connected to a third driving unit. In order to improve the control effect, the second control electrode group can also be connected to a plurality of third driving units, and the third driving unit group is configured to drive the second liquid crystal layer corresponding to the second control electrode group in the first state or the second state. The first state is that the second liquid crystal layer is in a light-transmitting state, and the second state is that the second liquid crystal layer is in an opaque state. It is understandable that each pixel electrode is connected with a second driving unit, so that the second liquid crystal layer corresponding to the pixel electrode is in a third state, where the third state is a state in which the second liquid crystal layer displays a preset picture.

Figure 10:
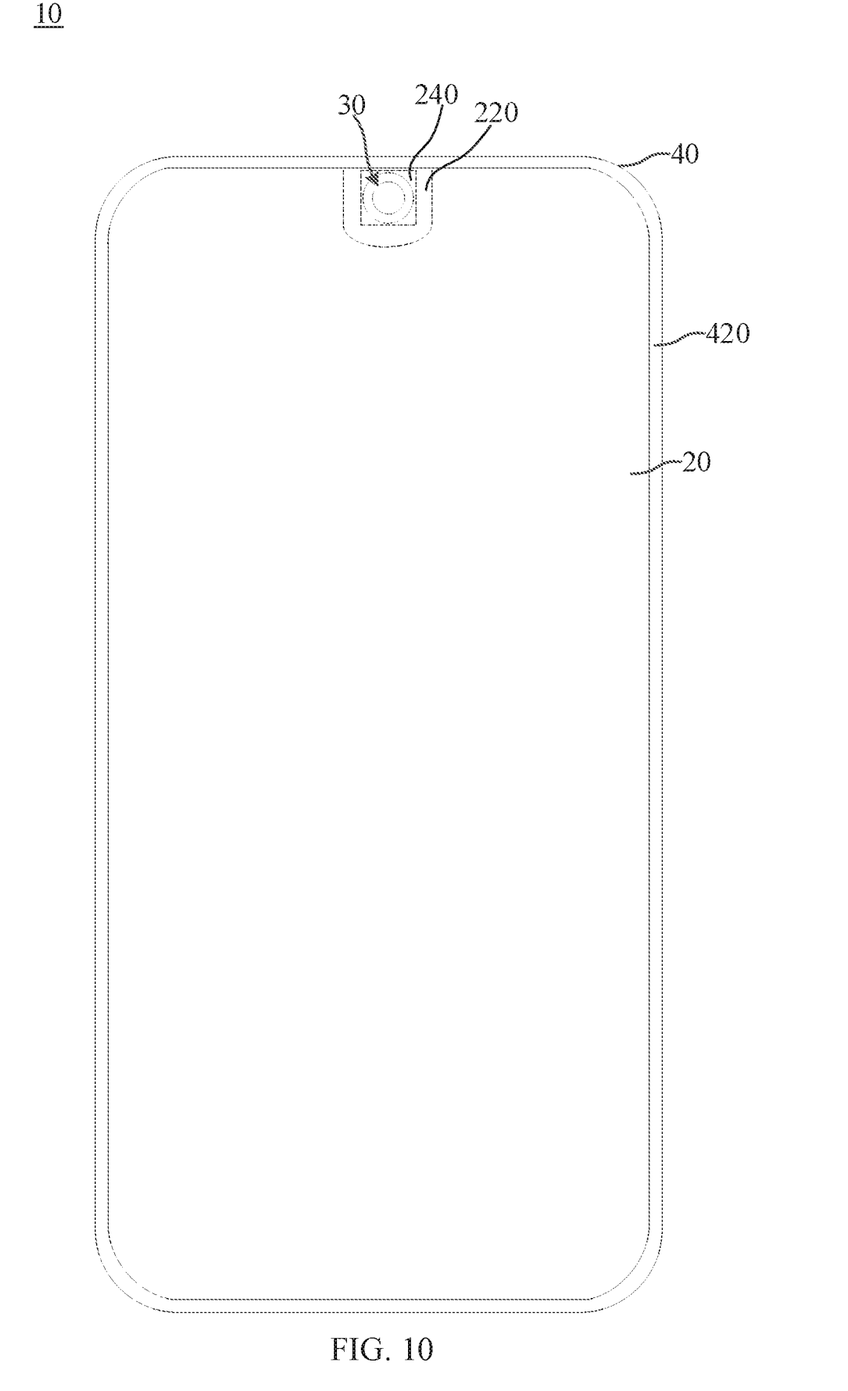
FIG. 10 is a schematic structural view of an electronic device according to one embodiment of the present invention.

For a more comprehensive understanding of the electronic devices in the embodiments of the present invention. The structure of the electronic device is further explained below. Referring to FIG. 10, FIG. 10 is a schematic structural view of an electronic device according to one embodiment of the present invention. The electronic devices provided by the embodiments of the present invention can be mobile terminal devices such as mobile phones and tablet computers, and can also be game devices, augmented reality (AR) devices, virtual reality (VR) devices, on-board computers, and laptop computers, data storage devices, audio playback devices, video playback devices, wearable devices, and other devices with display panels, where the wearable devices can be smart bracelets, smart glasses, etc.

FIG. 10 shows an example in which the electronic device 10 is a mobile phone, where the electronic device 10 comprises a display panel 20, and the display panel 20 can be used to display images. The display panel 20 comprises a first display area 220 and a second display area 240, and a light transmittance of the second display area 240 is greater than a light transmittance of the first display area 220. The electronic device 10 further comprises a camera device 30, which is at least partially disposed relative to the second display area 240, that is, the lens of the camera device 30 is disposed toward the second display area 240. The camera device 30 is configured to obtain external light signals passing through the second display area 240 for imaging, that is, the camera device 30 can take photos or videos through the second display area 240. In order to achieve the integrity of the display panel, the first display area 220 and the second display area 240 may be integrally formed, which increases the screen-to-body ratio of the display panel 20.

The electronic device 10 further comprises a housing 40. The housing 40 may comprise a back cover (not shown) and a frame 420, and the frame 420 is disposed around the periphery of the back cover. The display panel 20 may be disposed in the frame 420, and the display panel 20 and the back cover may be used as two opposite sides of the electronic device 10. The camera device 30 is provided between the back cover of the housing 40 and the display panel 20. The display panel 20 may be a full screen, that is, the display surface of the display panel 20 is basically a display area. The display panel 20 may also be provided with a cover plate. The cover plate covers the display panel 20 to protect the display panel 20 and prevent the display panel 20 from being scratched or damaged by water. The cover plate may be a transparent glass cover plate, so that the user can observe the information displayed on the display panel 20 through the cover plate. For example, the cover plate may be a cover plate made of sapphire.

Electronic device may further comprise a circuit board, a battery, and a middle plate. The frame 420 is disposed around the middle plate. The frame 420 and the middle plate may form a middle frame of the electronic device 10. The middle plate and the frame 420 form an accommodating cavity on both sides of the middle plate. One of the accommodating cavities is configured to accommodate the display panel 20, and the other accommodating cavity is configured to accommodate circuit boards, batteries, and other electronic components or functional components of the electronic device 10.

The middle plate may have a thin plate, sheet structure, or a hollow frame structure. The middle frame is configured to provide support for the electronic components or functional components in the electronic device 10 so as to install the electronic components and functional components in the electronic device 10 together. Functional components such as the camera device 30, the receiver, and the battery of the electronic device 10 can be mounted on the middle frame or circuit board for fixing. It is understandable that the material of the middle frame may comprise metal or plastic.

The circuit board can be installed on the middle frame. The circuit board may be the main board of the electronic device 10. The circuit board may be integrated with one or more of functional components such as a microphone, a speaker, a receiver, a headphone interface, an acceleration sensor, a gyroscope, and a processor. At the same time, the display panel 20 may be electrically connected to the circuit board to control the display of the display panel 20 through a processor on the circuit board. The display panel 20 and the camera device 30 may both be electrically connected to the processor. When the processor receives a shooting instruction, the processor controls the light-transmitting area to turn off the display, and controls the camera device 30 to collect images through the second display area. When the processor does not receive the shooting instruction and receives the image display instruction, the processor controls the first display area and the second display area to display images together.

The battery can be installed on the middle frame. At the same time, the battery is electrically connected to the circuit board, so that the battery can supply power to the electronic device 10. A power management circuit can be disposed on the circuit board. The power management circuit is configured to distribute the voltage provided by the battery to various electronic components in the electronic device 10.

In the present invention, the second liquid crystal layer 241 disposed in the second display area is electrically connected to the second driving unit group disposed in the first display area through the transparent connection layer 246, and the second driving unit group being opaque is disposed in the first display area. One display area increases the light transmittance of the second display area, and the camera device can collect external light signals through the second display area for imaging.

The above describes in detail a display panel and an electronic device provided by the embodiments of the present application. In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:
1. A display panel, comprising:
    a first display area comprising a first liquid crystal layer and a driving circuit layer, wherein the first liquid crystal layer and the driving circuit layer are stacked, the driving circuit layer comprises a first driving unit group and a second driving unit group, and the first driving unit group is configured to drive the first liquid crystal layer; and a second display area adjacent to the first display area, wherein the second display area comprises a second liquid crystal layer and a transparent connection layer, and the second driving unit group drives the second liquid crystal layer through the transparent connection layer;

wherein the transparent connection layer comprises a transparent electrode, the transparent electrode is configured to connect a thin film transistor in the second driving unit group and a pixel electrode disposed in the second display area; the second display area further comprises a common electrode layer and a pixel electrode layer, the transparent connection layer is disposed on a side of the common electrode layer away from the pixel electrode layer, and the second liquid crystal layer is disposed on a side of the pixel electrode layer away from the common electrode layer;

the first display area comprises a transition display area and a main display area, the transition display area is adjacent to the second display area, the first driving unit group and the second driving unit group are disposed in the transition display area.

2. The display panel according to claim 1, wherein the first display area further comprises an electrical connection layer, and the second driving unit group is connected to the transparent connection layer through the electrical connection layer.

3. The display panel according to claim 2, wherein the electrical connection layer and the transparent connection layer are disposed in a same layer.

4. The display panel according to claim 2, wherein an insulating layer is disposed between the electrical connection layer and the driving circuit layer, a first via hole is formed in the insulating layer, and the electrical connection layer is connected to the second driving unit group through a first trace line disposed in the first via hole.

5. The display panel according to claim 1, wherein the pixel electrode layer comprises a pixel electrode group, and the pixel electrode group is connected to the transparent connection layer through a second trace line disposed in a second via hole.

6. The display panel according to claim 5, wherein the second driving unit group comprises a plurality of second driving units, the pixel electrode layer further comprises a plurality of control electrodes, each of the control electrodes is connected to one of the second driving units, and the second driving unit is configured to drive the second liquid crystal layer corresponding to the control electrode in a first state or a second state.

7. The display panel according to claim 5, wherein the second driving unit group comprises a plurality of second driving units, the pixel electrode layer further comprises a plurality of control electrodes, at least two of the control electrodes are electrically connected to form a first control electrode group, and the first control electrode group is connected to one of the second driving units, and the second driving unit is configured to drive the second liquid crystal layer corresponding to the first control electrode group in a first state or a second state.

8. The display panel according to claim 5, wherein the display panel further comprises a non-display area, and a third driving unit group is disposed in the non-display area, the pixel electrode layer further comprises a plurality of control electrodes, at least two control electrodes are electrically connected with each other to form a second control electrode group, the second control electrode group is connected to the third driving unit group, the third driving unit group is configured to drive the second liquid crystal layer corresponding to the second control electrode group in a first state or a second state, and the second driving unit group is configured to drive the second liquid crystal layer corresponding to the pixel electrode group in a third state.

9. The display panel according to claim 1, wherein the main display area is provided with a plurality of first pixels, the transition display area is provided with a plurality of second pixels, and a distribution density of the second pixels is less than a distribution density of the first pixels.

10. The display panel according to claim 9, wherein the second display area is provided with a plurality of third pixels, and a distribution density of the third pixels is less than or equal to a distribution density of the second pixels.

11. The display panel according to claim 9, wherein an edge area is disposed between the transition display area and the main display area, the edge area comprises a first part located in the transition display area, and a distribution density of the second pixels in the first part is greater than a distribution density of other second pixels.

12. The display panel according to claim 9, wherein an edge area is disposed between the transition display area and the main display area, the edge area comprises a second part located in the transition display area, and a distribution density of the second pixels in the second part is less than a distribution density of other second pixels.

13. The display panel according to claim 9, wherein an edge area is disposed between the transition display area and the main display area, the edge area comprises a first part located in the transition display area and a second part located in the main display area, a distribution density of the second pixels in the first part is greater than a distribution density of other second pixels, and a distribution density of the first pixels in the second part is less than a distribution density of other first pixels.

14. An electronic device, comprising:
a display panel, wherein the display panel comprises a first display area and a second display area, the first display area comprises a first liquid crystal layer and a driving circuit layer, the first liquid crystal layer and the driving circuit layer are stacked, the driving circuit layer comprises a first driving unit group and a second driving unit group, and the first driving unit group is configured to drive the first liquid crystal layer; and the second display area adjacent to the first display area, the second display area comprises a second liquid crystal layer and a transparent connection layer, and the second driving unit group drives the second liquid crystal layer through the transparent connection layer; and a camera device, wherein the camera device is at least partially disposed and corresponds to the second display area, and the camera device collects external light signals through the second display area for imaging;

wherein the transparent connection layer comprises a transparent electrode, the transparent electrode is configured to connect a thin film transistor in the second driving unit group and a pixel electrode disposed in the second display area; the second display area further comprises a common electrode layer and a pixel electrode layer, the transparent connection layer is disposed on a side of the common electrode layer away from the pixel electrode layer, and the second liquid crystal layer is disposed on a side of the pixel electrode layer away from the common electrode layer;

the first display area comprises a transition display area and a main display area, the transition display area is adjacent to the second display area, the first driving unit group and the second driving unit group are disposed in the transition display area.

15. The electronic device according to claim 14, wherein the first display area further comprises an electrical connection layer, and the second driving unit group is connected to the transparent connection layer through the electrical connection layer.

16. The electronic device according to claim 14, wherein the first display area comprises a transition display area and a main display area, the transition display area is adjacent to the second display area, and the second driving unit group is disposed in the transition display area.

17. The electronic device according to claim 16, wherein the main display area is provided with a plurality of first pixels, the transition display area is provided with a plurality of second pixels, and a distribution density of the second pixels is less than a distribution density of the first pixels.

18. The electronic device according to claim 14, further comprising a processor, wherein the camera device and the display panel are electrically connected to the processor, and the processor is configured to control light transmittance of the second display area to be greater than a preset when the camera device is in an operating state, and the second display area is controlled to display preset picture when the camera device is in a non-working state.

* * * * *